(12) United States Patent
Brunfeld

(10) Patent No.: US 6,629,772 B2
(45) Date of Patent: Oct. 7, 2003

(54) METHOD AND APPARATUS FOR ILLUMINATION AND ENTERTAINMENT BY LIGHT EMITTED FROM A GUIDE VIA SCATTERING

(76) Inventor: Andrei Brunfeld, 10178 Ridgeway Dr., Cupertino, CA (US) 95014

( * ) Notice: Subject to any disclaimer, the term of this patent is extended or adjusted under 35 U.S.C. 154(b) by 0 days.

(21) Appl. No.: 10/057,621

(22) Filed: Oct. 25, 2001

(65) Prior Publication Data

US 2003/0081431 A1 May 1, 2003

(51) Int. Cl.[7] .............. B29D 11/00; F21V 5/00; G02B 6/00
(52) U.S. Cl. .......... 362/582; 362/31; 362/558; 362/555; 362/800; 362/559; 362/551; 362/257; 362/326
(58) Field of Search .......... 362/31, 558, 555, 362/559, 800, 551, 257, 317, 326, 582

(56) References Cited

U.S. PATENT DOCUMENTS

| | | | | |
|---|---|---|---|---|
| 4,232,465 A | * | 11/1980 | Stoddard | 40/546 |
| 4,257,084 A | * | 3/1981 | Reynolds | 362/31 |
| 5,649,755 A | * | 7/1997 | Rapisarda | 362/31 |
| 6,289,150 B1 | * | 9/2001 | Zarian et al. | 385/31 |
| 6,301,418 B1 | * | 10/2001 | Freier et al. | 385/123 |

OTHER PUBLICATIONS

Gianotti et al., U.S. Publication No. US 2002/0139023 A1, LED Illuminated Plaque.*
WO 90/04132, Illuminating System, Aikens, Apr. 19, 1990.*
European Patent Application 0561329 A1, Kazuaki et al., Sep. 22, 1993.*

* cited by examiner

Primary Examiner—Sandra O'Shea
Assistant Examiner—Sharon Payne
(74) Attorney, Agent, or Firm—Andrew M. Harris; Harry M. Weiss; Weiss, Moy & Harris, P.C.

(57) ABSTRACT

A method and apparatus for illumination and entertainment by light emitted from a guide via scattering provides a new form of visible lighting. An illumination source is coupled to an optical guide to produce a beam within the guide. The beam is disrupted by a emitting surface which may have design features embedded thereon. The disruption causes scattering of the beam, producing an illuminated body. The disruption may be a matte coating on a side wall of the guide, a lens with a matte image thereon at the end of the guide, or other discontinuity that results in an entertaining or pleasing illumination pattern.

18 Claims, 4 Drawing Sheets

METHOD AND APPARATUS FOR ILLUMINATION AND ENTERTAINMENT BY LIGHT EMITTED FROM A GUIDE VIA SCATTERING

BACKGROUND OF THE INVENTION

1. Field of the Invention

The present invention relates generally to visible lighting systems, and more specifically, to an illumination and entertainment device producing illumination via light guiding and scattering.

2. Background of the Invention

Visible light displays and illumination systems are in use in a multitude of applications. Illuminators or illuminated sculptures are used to decorate and sometimes illuminate rooms in private and public places, to provide decorative and sometimes functional lighting.

Visible light displays provide a medium for artistic expression and new visible light displays that may be adapted to various two or three-dimensional expressions are in great demand. Hand-held visible light devices are also very popular so that users may express and even identify themselves by moving or holding such device.

Existing visual displays and illuminators using optical guiding techniques fall into many categories, but all of them typically use a guide terminated in an emitting surface that emits the light at an end of the guide to launch an illuminating beam. For example, optical fiber lamps are formed with a cut end or a lens-shaped termination at the end of the optical fiber. End-termination provides a light source that is only visible from a limited angle determined by the specific numerical aperture of the fibers in the bundle and that provides an illuminating beam generally limited to one general direction.

Chemical or other light wands as are sold at festivals and popular music concerts may be terminated with a cut or lens, or they may have a matte projector, but they typically do not incorporate a guide, and thus suffer a loss in illumination due to the need to make their outer illuminating surface opaque enough to hide their illumination source, or the illumination source is rendered visible. For example, a flashlight equipped with a semi-transparent wand end such as toy "light sabers" does not include an optical guide, but merely a semi-opaque projection screen that may be cylindrical in shape.

In order to produce a more pleasant illumination while avoiding visibility of the illumination source (such as a light bulb filament), solutions exist such as frosting the inner surface of a light bulb or fixture, or indirect illumination techniques may be used, completely masking the source of the illumination. All of these solutions are limited by the arrangements described as artistic lighting effects generated by a bulb matte surface or an indirectly illuminated surface are limited.

Therefore, it is desirable to provide a new visible lighting apparatus for illumination and entertainment display that guides light into a display where the light may be scattered in an entertaining form, is visible from wide angles, and has an intense appearance.

SUMMARY OF THE INVENTION

The above objective of providing a new visible lighting apparatus is accomplished by a method and apparatus for illumination and entertainment via scattered visible light. The apparatus includes an illumination source, a guide for guiding a beam from the illumination source and one or more emitting surface for producing an illuminated body from the illumination source by scattering the guided beam. The emitting surface may be included within the guide, disposed on a surface of the guide, attached to the end of the guide, or a combination of emitting surfaces may be incorporated within one embodiment of the present invention.

The foregoing and other objectives, features, and advantages of the invention will be apparent from the following, more particular, description of the preferred embodiment of the invention, as illustrated in the accompanying drawings.

DETAILED DESCRIPTION OF THE EMBODIMENTS

Figure 1:
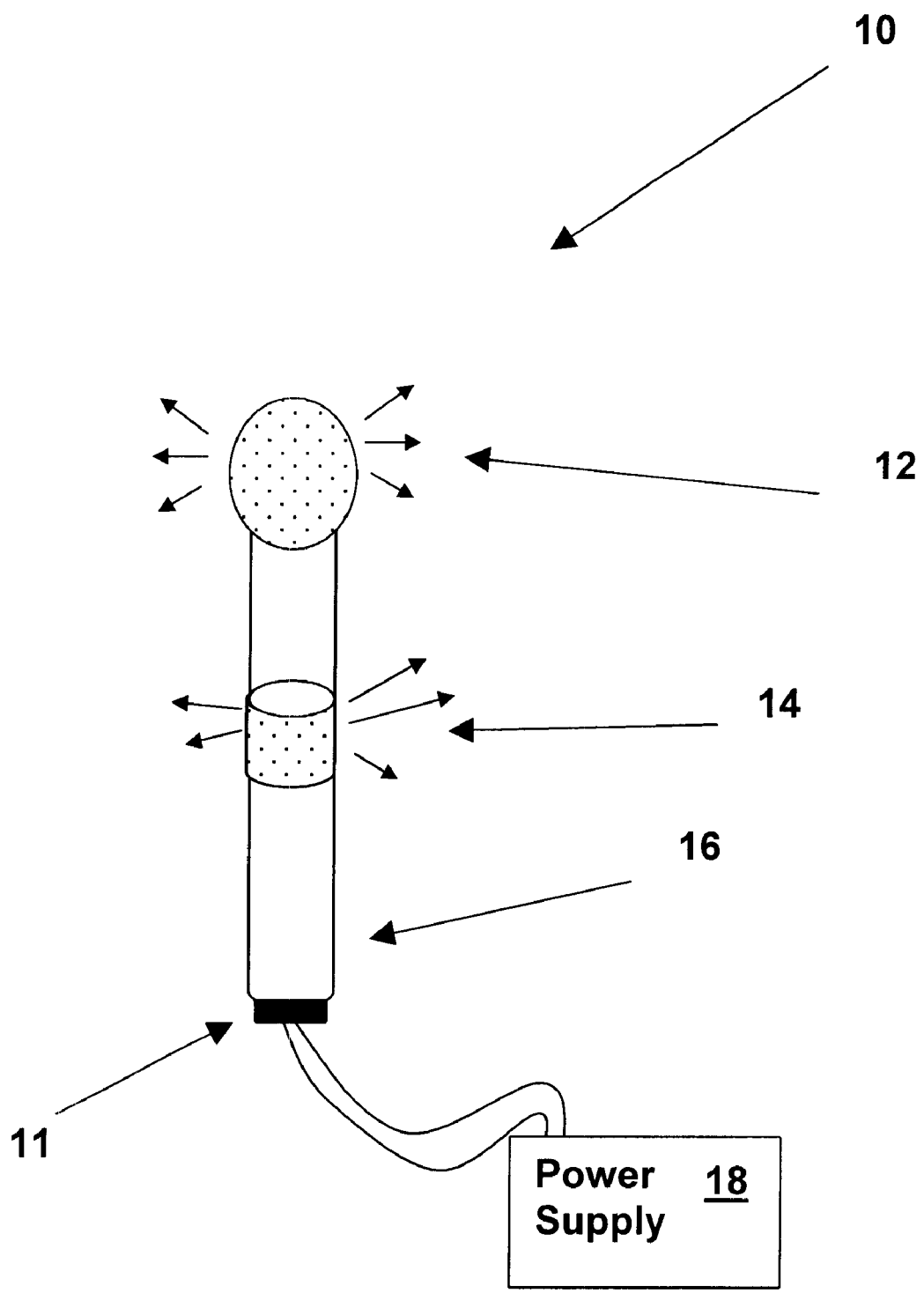
FIG. 1 is a pictorial diagram depicting an apparatus in accordance with a first embodiment of the present invention.

Referring now to the figures and in particular to FIG. 1, an apparatus 10 in accordance with a first embodiment of the present invention is shown. A visible light emitting diode (LED) 11 is coupled to an end of an optical guide 16. LED 11 is electrically coupled to a power supply 18 for providing power to LED 11. The power supply may be switched with a standard switch, touch switch circuits, proximity sensors or other suitable switching means, and the power supply may be a wall-mount transformer, battery or other suitable power supply. LED 11 is generally a super-bright LED of the type recently developed for optical telecommunications circuits. The above-mentioned type of LED is particularly suitable for use within embodiments of the present invention as it emits light of sufficient intensity to provide an illumination for lighting optical forms that are generated by embodiments of the present invention. However, the present invention also applies to forms that are lit by standard sources such as incandescent or metal-halide vapor lamps as well as solar illumination, cold-cathode fluorescent lamps or other standard or non-standard illumination sources.

Optical guide 16 is generally fabricated from a transparent material such as an acrylic or glass and has a higher index of refraction than a surrounding medium (in this example, air). Therefore, the illumination beam generated by LED 11 is contained within guide 16 and the outer surface of guide 16 will not emit light toward the observer unless there are defects or intentional features embedded within guide 16 that scatter light within guide 16 or on the surface of guide 16. The present invention introduces one or more emitting surfaces inside or on the outer surface of guide 16 so that illumination and/or entertaining visible light displays are generated by scattering from the emitting surfaces. Known as "bodies", the visible light forms emitted from guide 16 can be made very intense and cast light over wide angles, in contrast to prior art optical fiber illuminators and their associated uses.

Apparatus 10 is a visible light entertainment device having simplified features. Emitting surface 14 is a matte surface etched, ground or otherwise formed in a band around the side wall of guide 16. Normally, light striking the side wall of guide 16 will be totally internally reflected, due to the illumination beam within guide 16 striking the wall at a angle larger than the critical angle determined by the optical and geometric characteristics of guide 16 with respect to its surrounding media. The introduction of the matte surface to form emitting surface 14 creates local scattering over the emitting surface 14, and the light emitted forms a visible body that is apparent to an observer as an intense band of light visible over wide angles. Alternatively, emitting surfaces in accordance with embodiments of the invention may include such structures as diffraction gratings or prisms. Although diffraction gratings are discrete, rather than continuously rough as in a matte surface, they represent an equivalent scattering mechanism that may be used to produce an emitting surface in accordance with embodiments of the present invention.

A second emitting surface 12 is attached to the end of guide 16 opposite LED 11 or to any other properly coupled location. Light that is not scattered by emitting surface 14 continues through guide 16 and is emitted by second emitting surface 12 to form a spherical body, also visible over wide angles. While the illustration depicts emitting surfaces having simple geometric forms (band, sphere), actual embodiments of the present invention may include surface decoration within those forms. For example, emitting surface 14 may have a "carved" design forming a three-dimensional sculpture on the side of guide 16 and second emitting surface 12 may be a sculpture forming a complex geometric shape. In a particular embodiment, second emitting surface 12 takes the shape of a flower with multiple petals, and emitting surface 14 is deleted leaving a non-illuminating stem and groups of the aforementioned apparatus are arranged in a vase. The flower illuminators described above may be lit with LEDs of various color, generating a pleasing and attention-getting visible display.

Figure 2:
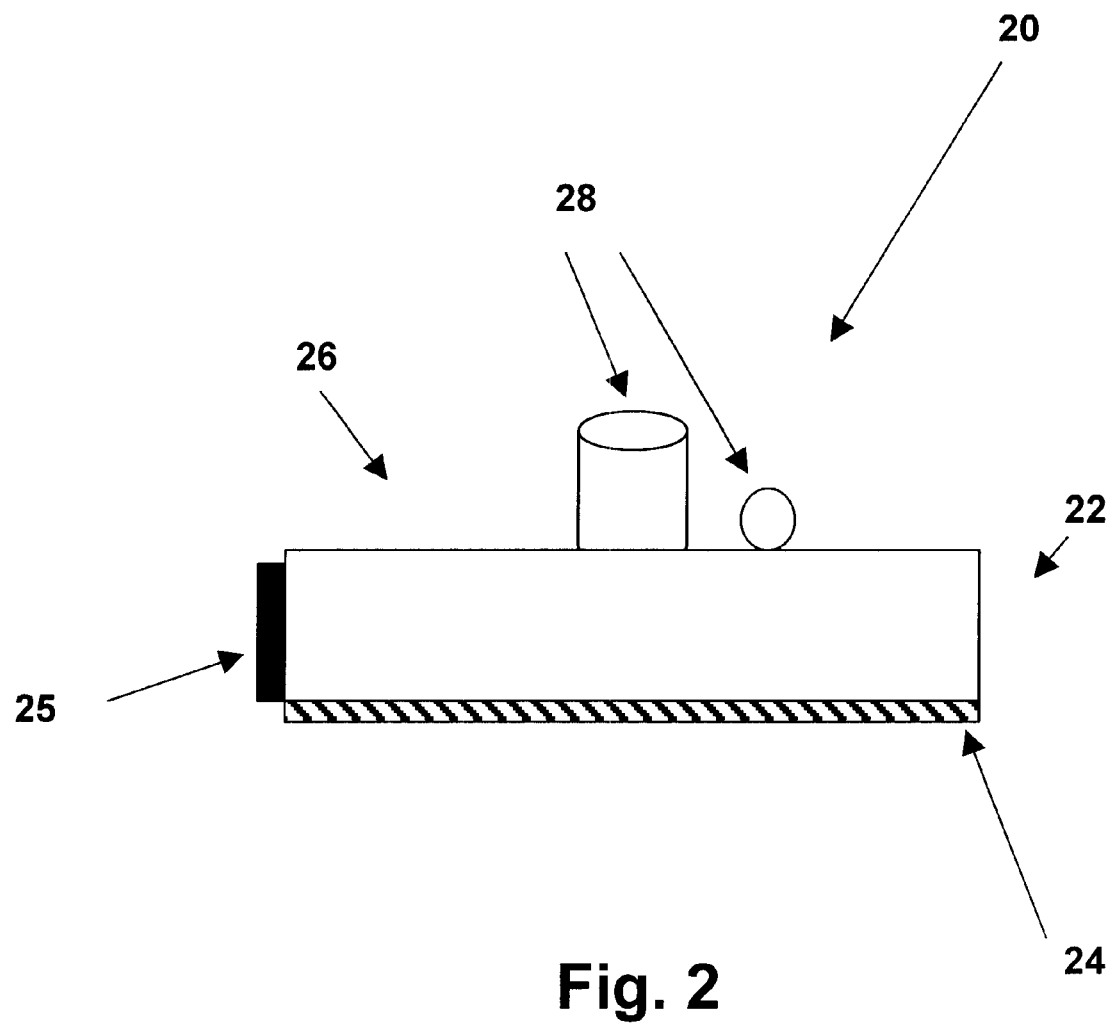
FIG. 2 is a pictorial diagram depicting an apparatus in accordance with a second embodiment of the present invention.

Referring now to FIG. 2, an apparatus 20 in accordance with a second embodiment of the invention is shown. In the embodiment of FIG. 2, an LED 25 is coupled to an edge of a rectangular guide 26 and the power supply connections are not shown, but can be as described for the first embodiment of the present invention. Apparatus 20 is used as an illuminator for a display that may be varied by placing various objects 28 on a top transparent surface of guide 26. Normally, no light would be emitted from guide 26, as the top transparent surface internally reflects light back into guide 26. However, a matte emitting surface 24 is formed on the bottom surface of guide 26, generating a scattering effect that scatters light upward through guide 26 exceeding the critical angle and causing light to be emitted through the top surface of guide 26. Thus, objects 28 are illuminated by the scattered light to form "bodies" that will be visible over wide angles. The coupling of objects 28 to guide 26 may be enhanced by introducing a liquid, such as water, to prevent air gaps between objects 28 and guide 26 from disrupting the scattered illumination. The end 22 of guide opposite LED 25 may be rendered reflective (by depositing a reflective metal coating, attaching a reflective part, etc.) so that light is not emitted from end 22. Emitting surface 24 may have various patterns of differing colors for generating special effects in combination with objects 28, according to a particular artistic design concept.

Figure 3:
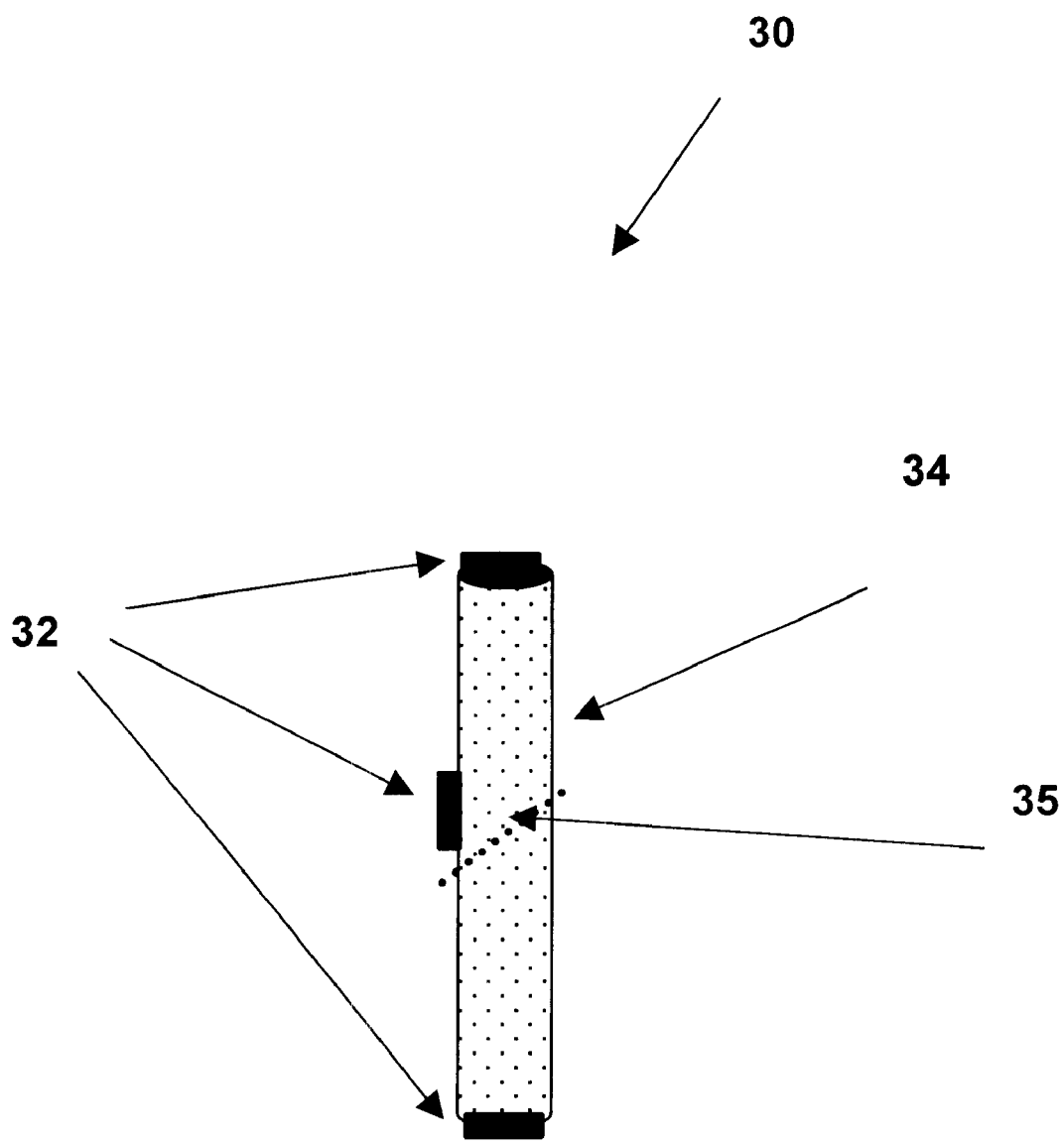
FIG. 3 is a pictorial diagram depicting an apparatus in accordance with a third embodiment of the present invention.

Referring now to FIG. 3, an apparatus 30 in accordance with a third embodiment of the invention is depicted. In the third embodiment, multiple LEDs 32 are attached to a guide 34. The third embodiment demonstrates how multiple illumination sources may be used to produce an entertaining visible light display. LED's of differing color may be used at each location of LEDs 32. The entire surface of guide 34 is matted to form a continuous emitting surface (but alternatively bands of matte surface, carved designs, etc. may be used). The center one of LEDs 32 is attached to the side wall of guide 34 and light emitted by LED 32 is coupled into guide 34 by mirror 35, demonstrating that coupling of the illuminator(s) may be made at points other than an end of an optical guide if proper coupling design is considered, and the resulting illumination body produced by emitting surface is a cylindrical body transitioning in color from one end of guide 34 to the opposite end. Alternatively, several branch "feedlines" comprising optical guides may be coupled into single guide 34 to provide additional illumination sources. Other colors are produced by the gradual loss of light through the continuous emitting surface produced by the matte side wall of guide 34 so that a pleasing and entertaining color transition is achieved. For example, a cylindrical guide having a red-orange LED at a first end and a blue LED at a second end (with no center illuminator) will produce degenerated white light comprising part of the total visible spectrum at a central location that is dimmer than the light near the two ends, and a transition from white to orange toward the orange LED and a transition to blue toward the blue LED.

Figure 4:
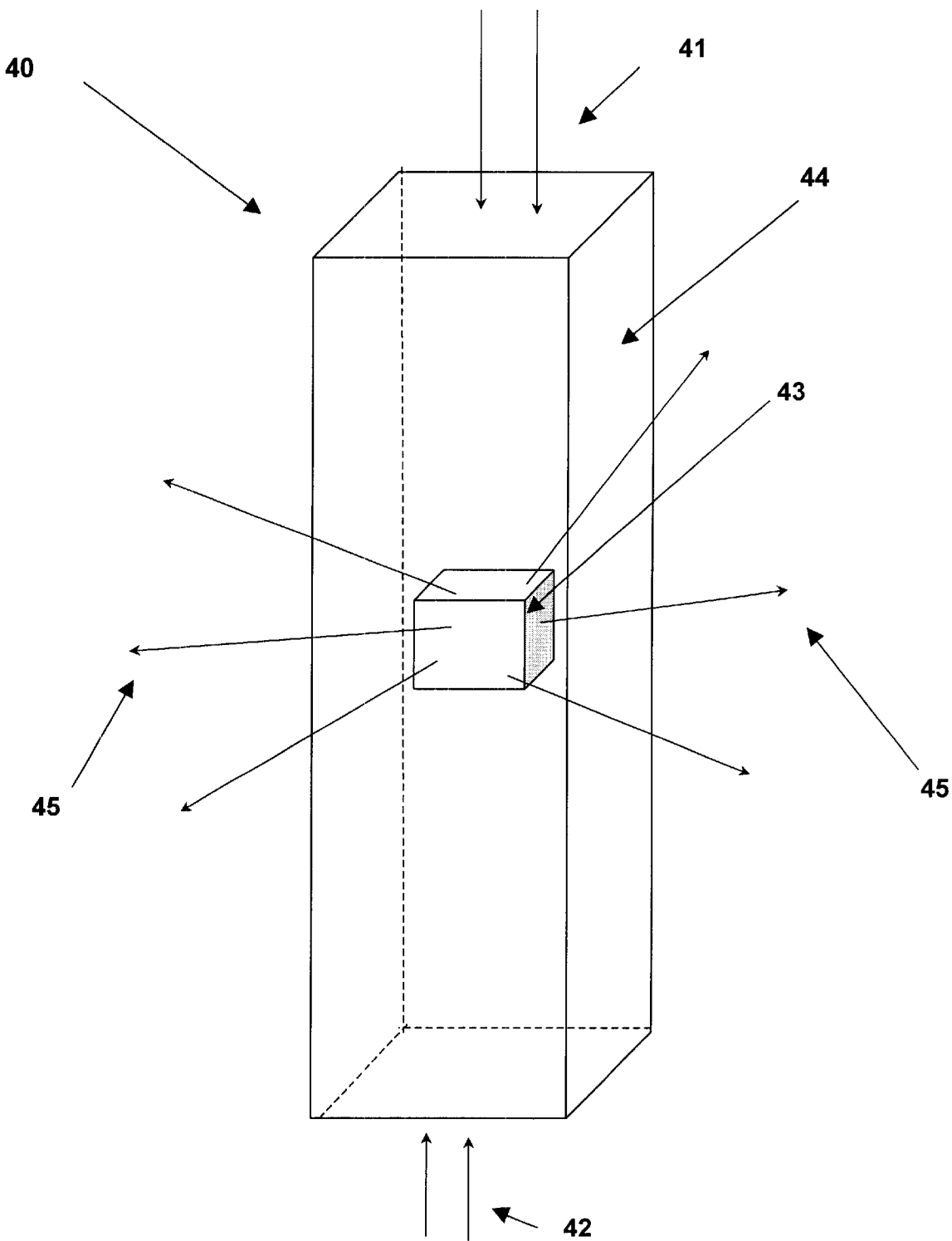
FIG. 4 is a pictorial diagram depicting an apparatus in accordance with a forth embodiment of the present invention.

Referring now to FIG. 4, an apparatus 40 in accordance with a fourth embodiment of the invention is depicted. A guide 44 accepts illumination 41 from a source (not shown) and optionally other illumination 42 and guides the light to the other end of guide 44. Without a disturbance in the guide, no light will be emitted and/or absorbed through the end surfaces of the guide, rendering it not visible (if the guide has no imperfections). A scattering surface 43 in the form of a three dimensional cube is introduced within guide 44 and causes light 45 to be scattered over wide angles. The fourth depicted embodiment illustrates that objects may be introduced within guide 44 to provide an entertaining visible display. The objects may have sculptural features or may be simple geometric shapes of two or three-dimensional form. Additionally, the present invention contemplates structures that use media that are liquid in form, and guides formed outside a central region having a lower refractive index than the surrounding media. For example, a water tank may be used as a guide with a plastic rod introduced having a lower refractive index than water. Light coupled to the rod will be guided outside the surface of the rod within the water, but will nonetheless form a guide in the areas exposed to air. Emitting surfaces on the rod or within the water immediately surrounding the rod will cause scattering of light in accordance with the operation of the invention.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A visible light device, comprising:
    an illumination source; and
    a flexible plastic guide coupled to the illumination source for guiding a beam from said illumination source, wherein said guide includes a rough emitting surface having surface features incorporated thereon for producing an illuminated body by scattering light from said beam, wherein said surface features incorporate a decorative non-functional design element, whereby said light device provides an artistic and entertaining display.

2. The visible light emitting device of claim 1, wherein said illumination source is coupled to an end of said guide, and wherein said emitting surface is located at a second end of said guide opposite said illumination source.

3. The visible light emitting device of claim 2, wherein said emitting surface is disposed at said second end of said guide, said emitting surface having a matte finish.

4. The visible light emitting device of claim 3, wherein said emitting surface is a sculpture formed at said second end of said guide.

5. The visible light emitting device of claim 1, wherein said emitting surface is disposed on a side of said guide.

6. The visible light emitting device of claim 5, wherein said emitting surface is a pattern etched on said side of said guide.

7. The visible light emitting device of claim 5, wherein said emitting surface is a matte surface disposed on a side of said guide.

8. The visible light emitting device of claim 5, wherein said emitting surface is a sculpture formed on said side of said guide.

9. The visible light emitting device of claim 1, further comprising one or more additional emitting surfaces having features for producing one or more additional illuminated bodies by scattering light from said beam.

10. The visible light emitting device of claim 9, wherein at least one of said additional emitting surfaces is disposed on a side of said guide and said emitting surface is located at an end of said guide.

11. The visible light emitting device of claim 1, wherein said illumination source is coupled to a side of said guide between the ends of said guide.

12. The visible light emitting device of claim 11, further comprising at least one additional illumination source coupled to an end of said guide.

13. The visible light emitting device of claim 12, wherein said illumination source and said at least one additional illumination source produce illumination beams of differing colors.

14. The visible light emitting device of claim 1, wherein emitting surface is a rough surface disposed within said guide, whereby light is scattered within said guide to form said illuminated body.

15. A visible light emitting device, comprising:
an illumination source;
a flexible plastic guide coupled to the illumination source for guiding a beam from said illumination source; and
means forming part of said flexible plastic guide for forming an illuminated body from said beam, said means incorporating integral surface features having a non-functional design element, whereby said light device provides an artistic and entertaining display.

16. The visible light emitting device of claim 15, wherein said means for forming an illuminated body further comprises means for forming multiple illuminated bodies.

17. A method for generating an illuminated body, comprising:
feeding a flexible plastic optical guide with a beam from an illumination source;
disrupting propagation of light within said optical guide via a scattering surface of said guide, said scattering surface including a non-functional design element so that an illuminated body is produced by light scattered from said scattering surface, whereby said light device provides an artistic and entertaining display.

18. The method of claim 17, further comprising, generating said scattering surface by sculpting a design on said optical guide.

* * * * *